United States Patent
Daoud-Triki et al.

(10) Patent No.: US 8,306,542 B2
(45) Date of Patent: Nov. 6, 2012

(54) COMMUNICATION METHODS AND TERMINALS FOR IMPROVING THE TRANSFER OF CONNECTION BETWEEN CELLS BELONGING TO DIFFERENT NETWORKS

(75) Inventors: Khadija Daoud-Triki, Issy les Moulineaux (FR); Rida Zouaoui, Gennevilliers (FR); Lionel Obadia, Paris (FR)

(73) Assignee: France Telecom, Paris (FR)

( * ) Notice: Subject to any disclaimer, the term of this patent is extended or adjusted under 35 U.S.C. 154(b) by 420 days.

(21) Appl. No.: 12/087,717

(22) PCT Filed: Jan. 9, 2007

(86) PCT No.: PCT/FR2007/050627
§ 371 (c)(1),
(2), (4) Date: Mar. 4, 2009

(87) PCT Pub. No.: WO2007/080348
PCT Pub. Date: Jul. 19, 2007

(65) Prior Publication Data
US 2009/0323630 A1    Dec. 31, 2009

(30) Foreign Application Priority Data

Jan. 10, 2006    (FR) ...................... 06 50079

(51) Int. Cl.
*H04W 36/00*    (2009.01)
*H04W 4/00*    (2009.01)

(52) U.S. Cl. ..................... 455/450; 455/436; 455/552.1; 370/331

(58) Field of Classification Search ................. 455/450, 455/436, 552.1; 370/331
See application file for complete search history.

(56) References Cited

U.S. PATENT DOCUMENTS

| 7,848,776 | B2 * | 12/2010 | Akiba et al. | ............... 455/552.1 |
| 2003/0050063 | A1 | 3/2003 | Faerber | |
| 2003/0134650 | A1 | 7/2003 | Sundar et al. | |
| 2004/0063426 | A1 | 4/2004 | Hunkeler | |
| 2005/0059400 | A1 * | 3/2005 | Jagadeesan et al. | .......... 455/436 |
| 2006/0240828 | A1 * | 10/2006 | Jain et al. | .......... 455/436 |
| 2007/0091844 | A1 * | 4/2007 | Huang et al. | ................. 370/331 |

FOREIGN PATENT DOCUMENTS

| EP | 1 395 077 | 3/2004 |
| FR | 2 863 133 | 6/2005 |

OTHER PUBLICATIONS

"Digital cellular telecommunications system (Phase 2+); Generic access to the A/Gb interface; Stage 2 (3GPP TS 43.318 version 6.4.0 Release 6); ETSI TS 143 318", ETSI Standards, European Telecommunications Standards Institute, Sophia-Antipo, FR, vol. 3-G1, No. V640, Nov. 2005.

* cited by examiner

*Primary Examiner* — Jinsong Hu
*Assistant Examiner* — Jean Chang
(74) *Attorney, Agent, or Firm* — Cozen O'Connor

(57) ABSTRACT

This method, which can be implemented by a terminal, includes a step (E30, E40) of assigning a dummy signal level to a cell defined by an access point of a local area network in such a way as to respect the preference of a user who has elected to give preference, when moving around, to attaching the mobile terminal to a cell of a public cellular network over attaching itself to a cell of a cellular local area network.

9 Claims, 3 Drawing Sheets

COMMUNICATION METHODS AND TERMINALS FOR IMPROVING THE TRANSFER OF CONNECTION BETWEEN CELLS BELONGING TO DIFFERENT NETWORKS

RELATED APPLICATIONS

This is a U.S. National Phase Application under 35 USC 371 of International Application PCT/FR2007/050627, filed on Jan. 9, 2007.

This application claims the priority of French application no. 06/50079 filed on Jan. 10, 2006, and the content of which is hereby incorporated by reference.

BACKGROUND OF THE INVENTION

The field of the invention is that of telecommunications, to be more precise that of cellular telecommunications networks.

This document distinguishes between two types of cellular network, namely:
cellular networks operating in a frequency band allocated to a telecommunications operator with the use thereof being subject to the operator being authorized; these include second generation cellular GSM Edge Radio Access Networks (GERAN), third generation UMTS Terrestrial Radio Access Networks (UTRAN), and other networks (AMPS, D-AMPS, etc.); and
cellular networks formed by local area telecommunications networks connected to a cellular network of the first type, in particular home local area networks managed by a Generic Access Network (GAN) architecture as defined by 3GPP Release 6; these local area networks are not limited to wireless local area telecommunications networks operating in public frequency bands not allocated to operators, and they also include cable local area networks, for example Ethernet networks; throughout the remainder of this document these networks are referred to as "local area networks".

The architecture of public cellular networks is one in which base stations, called base transceiver stations (BTS) in a GERAN and Nodes B in a UTRAN, are controlled by controllers, called base station controllers (BSC) in a GERAN and radio network controllers (RNC) in a UTRAN, that are connected to a "circuit" core network and to a "packet" core network.

In cellular GAN, cells are defined by access points (AP) enabling users to access mobile services via an Internet Protocol (IP) connection set up with an element of the network called the GAN controller (GANC), responsible for controlling access points. Thus an access point constitutes a physical entity enabling a mobile user to be connected to the GANC via an IP connection.

In accordance with the above-mentioned standard, the GANC of the GAN are connected to the core network of the cellular GERAN and are seen by that core network as a BSC of the cellular GERAN architecture.

GANs extend the coverage of second generation networks by deploying these access points. Thus users, especially domestic users, can continue to access services of public cellular GERAN via their local area network access points rather than via the base station of the public GERAN.

The invention is more particularly concerned with the handover mechanism, i.e. the mechanism for connection transfer during a call, managed by the network and guaranteeing continuity of service to a terminal moving from one cell to an adjoining cell.

In the prior art, the BSCs or the RNCs manage handover of a mobile between two GERAN cells or between a GERAN cell and a UTRAN cell. The transfer can be initiated on the basis of signal levels of the attachment cell to which the mobile is attached and of the adjoining cells as measured by the mobile terminal and sent back to the network.

For example, in a GERAN, the mobile terminal sends back the signal levels of its attachment cell and of the six best adjoining GERAN cells. On receiving these measurements, the BSC can decide to transfer the mobile to another cell, which will then become its attachment cell. The handover algorithm is based on comparing the signal level of the current attachment cell to a threshold configured in the network. If the signal level is below the threshold, the future attachment cell is that with the highest signal level above the threshold provided that its level is above the threshold.

When a mobile is in the coverage areas of both a GERAN and a UTRAN, and is attached to the access GERAN, the BSC sends the identities of the adjoining GERAN and UTRAN cells to the mobile terminal in an information message. The mobile terminal periodically sends back the signal levels of the best six adjoining cells.

When a mobile terminal is in the coverage areas of both a GERAN and a UTRAN and is attached to the access UTRAN, it sends back the signal levels of the adjoining cells either periodically or when an event occurs, the RNC sending the type of initiator event to the mobile terminal.

The standard defines a number of events, including four events for measurements effected on the various types of access network:
Event 3A: the estimated quality of the current UTRAN frequency is below a certain threshold and the estimated quality on the other system (e.g. the GERAN system) is above a certain threshold.
Event 3B: the estimated quality on the other system (e.g. the GERAN system) is below a certain threshold.
Event 3C: the estimated quality on the other system (e.g. the GERAN system) is above a certain threshold.
Event 3D: change of the best cell in the other system (e.g. the GERAN system).

According to the standard, a GAN cell is configured in the BSCs and the RNCs of the public cellular networks as a GERAN adjoining cell. Consequently, the handover mechanism between a GAN cell and a GERAN cell, or between a GAN cell and a UTRAN cell, proceeds in substantially the same manner as handover within a GERAN, or as handover between a GERAN and a UTRAN.

The 3GPP standard TS 43.318: "Generic access to the A/Gb interface", Stage 2, v6.3.0 provides for users to specify their preferred attachment network. This preference, or mode, can be chosen from:
"GAN preferred" mode: the user wishes to access mobile services via the GAN as soon as it is available. If it is not available, the user uses the available access network (GERAN or UTRAN).
"GERAN/UTRAN preferred" mode: the user wishes to access mobile services via the access GERAN or UTRAN as soon as these are available. If they are not available, the user uses the GAN.
"GERAN/UTRAN only" mode: the user wishes to access mobile services only via the access GERAN or UTRAN.
"GAN only" mode: the user wishes to access mobile services only via the GAN.

Unfortunately, the 3GPP specification 43.318 cannot implement the "GERAN/UTRAN preferred" mode because it specifies that, when a mobile is in the dual coverage of a GAN and a public cellular network, it should send back to the network a maximum signal level for the GAN cell (i.e. a dummy signal level with the value 63), so that the GAN cell is always given preference over the cells of the public cellular network and is therefore chosen automatically by the network as the target cell for handover.

Similarly, according to the standard, if a mobile terminal is in the double coverage area of a public cellular network and a GAN, and if its attachment network is the GAN, then handover does not take account of the user's preference. Transfer can be initiated either by the network or by the mobile terminal.

When handover is initiated by the network, the network sends a GA-CSR UPLINK QUALITY INFORMATION message to the mobile terminal. The 44.318 standard specifies that when the quality stated in a GA-CSR UPLINK QUALITY INFORMATION message indicates a "radio problem" or an "undetermined problem", the mobile terminal must select another AP (i.e. it must remain in the intra-GAN mode), while for other types of quality the mobile terminal must initiate handover to the GERAN/UTRAN by sending a GA-CSR HANDOVER INFORMATION message that contains a list of the adjoining GERAN and UTRAN cells and their respective signal levels. When handover is initiated by the mobile terminal, the terminal sends a GA-CSR HANDOVER INFORMATION message directly to the network.

This mechanism does not implement the "GERAN/UTRAN preferred" mode because initiation of handover is independent of the user's preference.

OBJECT AND SUMMARY OF THE INVENTION

The present invention offers a solution that respects the preferences of mobile users who have elected to give preference to attachment of their mobile terminals to a cell of a public cellular network rather than to a cell of a cellular local area network.

The invention therefore implements the "GERAN/UTRAN preferred" mode of the above-mentioned 3GPP standard.

Thus a first aspect of the invention relates to a method of assigning a signal level that can be used in a mobile terminal connected to a base station defining an attachment cell attaching the terminal to an attachment public cellular network, the terminal being configured to give preference to attaching itself to a public cellular network over attaching itself to a local area network. This method includes:
 a step of detecting the presence of an active access point of a local area network and, should this happen, a step of assigning a dummy signal level to a cell defined at least by the access point;
 a step of measuring the signal level of the attachment cell and of cells of public cellular networks adjoining the attachment cell; and
 a step of sending to the base station both the dummy signal level and the measured signal levels, the attachment network using these levels to manage handover of the terminal from the attachment cell to one of the above-mentioned adjoining cells or to the cell defined at least by the access point, to guarantee continuity of service if the terminal is moving around.

In this method the dummy signal level is assigned as a function of a threshold stored in the terminal, this threshold being a threshold starting from which a cell of a public cellular network can be a candidate for handover.

In one particular embodiment, the above-mentioned threshold is configured in the mobile terminal.

The assignment method of the invention preferably includes a step of receiving this threshold from said attachment network. This has the advantage that this threshold can be varied dynamically, for example as a function of transmission conditions in the attachment network.

In a correlated way, the invention relates to a mobile terminal including:
 means for connection to a base station defining an attachment cell attaching the terminal to an attachment public cellular network;
 means for connection to an access point defining an attachment cell attaching the terminal to a local area network;
 configuration means for giving preference to attaching the terminal to a public cellular network over attaching the terminal to a local area network;
 means for detecting the presence of an active access point of a local area network;
 means for assigning a dummy signal level to a cell defined at least by the access point;
 means for measuring the signal level of the attachment cell and the cells of public cellular networks adjoining the attachment cell; and
 means for sending to the base station both the dummy signal level and the measured signal levels, these levels being used by the attachment network to manage handover of the terminal from the attachment cell to one of the above-mentioned adjoining cells or to the cell defined at least by the access point to guarantee continuity of service when said terminal is moving around.

In this terminal, the dummy signal level is assigned as a function of a threshold stored in the terminal, this threshold being a threshold starting from which a cell of a public cellular network can be a candidate for handover.

Thus the assignment method and the terminal of the invention assign a dummy signal level to the cell of the local area network so as to respect the preference of the user when the user elects to give preference to attachment to a public cellular network.

In particular, the cell of the local area network defined at least by the access point has a lower priority than the attachment cell and than the adjoining cells if there is at least one such cell for which the signal level is above the above-mentioned threshold.

The invention has a preferred application to managing handover in a GAN, GERAN, and/or UTRAN.

The solution of the invention is particularly advantageous in that it minimizes the modifications to be made to the standardized handover algorithms in the RNC and the BSC.

In this network the GAN cells are configured in the BSC or RNC as an adjoining GERAN cell.

Accordingly, in one particular embodiment of the invention, if the attachment cell is a cell of a public cellular UTRAN, the said dummy signal level Lev41 is chosen so that:

$$T\_GERAN \leq Lev41 \leq \max[T\_GERAN, \min(List\_GERAN)-1];$$

where:
 T_GERAN is a threshold level starting from which a cell of a public cellular GERAN can be a candidate for handover;

List_GERAN is the set of signal levels of the cells of a public cellular GERAN adjoining the attachment cell for which the signal level is greater than T_GERAN; and min(List_GERAN) is the minimum value of the set List_GERAN.

If the set List_GERAN is empty, the value min(List_GERAN) is made equal to 0.

Similarly, in one particular embodiment of the invention, when the attachment cell is a cell of a public cellular GERAN having no cell adjoining a public cellular UTRAN whose signal level is greater than or equal to a threshold from which a cell of a public cellular UTRAN can be a candidate for handover, the dummy signal is chosen so that:

$$T\_GERAN \leq Lev41 \leq \max[T\_GERAN, \min(List\_GERAN)-1].$$

Similarly, in one particular embodiment of the invention, if the attachment cell is a cell of a public cellular GERAN having at least one cell adjoining a public cellular UTRAN of signal level that is greater than or equal to a threshold from which a cell of a public cellular UTRAN can be a candidate for handover, the level Lev41 of the dummy signal is chosen so that:

$$Lev41 < T\_GERAN.$$

Another aspect of the invention relates to a method of initiating handover that can be used in a mobile terminal connected to an access point defining an attachment cell attaching the terminal to a local area network, the terminal being configured to give preference to attaching itself to a public cellular network over attaching itself to a local area network.

This method includes:
a step of detecting a public cellular network; and
a step of measuring the signal level of the cells of public cellular networks adjoining the attachment cell.

This method is noteworthy in that it also includes:
a step of comparing the measured levels with a predetermined threshold; and, if any of the measured levels is greater than said threshold,
a step of initiating handover by sending the access point the measured signal levels, these levels being used by the local area network to manage handover of the terminal to one of said adjoining cells to guarantee continuity of service if said terminal is moving around.

In a correlated way, the invention relates to a mobile terminal including:
means for connection to an access point defining an attachment cell attaching the terminal to a local area network;
means for connection to a base station defining an attachment cell attaching the terminal to an attachment public cellular network;
means for detecting a public network;
configuration means for giving preference to attaching the terminal to a public cellular network over attaching the terminal to a local area network;
means for measuring the signal level of the cells of public cellular networks adjoining the attachment cell;
means for comparing the signal level with a predetermined threshold; and
means for initiating handover, if any of the measured levels is greater than a threshold, by sending to the access point the measured signal levels, these levels being used by the local area network to manage handover of the terminal to one of the adjoining cells to guarantee continuity of service if the terminal is moving around.

Thus the initiation method and the mobile terminal of the invention implement the "GERAN/UTRAN preferred" mode when the mobile terminal is attached to a GAN by electing to send back to the network the signal levels of the public cellular network cells as soon as they are greater than a predetermined threshold.

In one particular embodiment, the various steps of the assignment method and/or the initiation method are determined by instructions of computer programs.

Consequently, the invention is also directed to a computer program on an information medium and which can be executed in a mobile terminal or more generally in a computer and includes instructions for executing the steps of the above assignment method and/or the above initiation method.

The program can use any programming language and take the form of source code, object code, or a code intermediate between source code and object code, such as a partially compiled form, or in any other suitable form.

The invention is also directed to a computer-readable information medium containing instructions of the above computer program.

The information medium can be any entity or device capable of storing the program, for example storage means, such as a read only memory (ROM), for example a CD ROM or a microelectronic circuit ROM, or magnetic storage means, for example a floppy disk or a hard disk.

The information medium can instead be a transmissible medium such as an electrical or optical signal, which can be conveyed via an electrical or optical cable, by radio or by other means. The program of the invention can in particular be downloaded over an Internet type network.

Alternatively, the information medium can be an integrated circuit into which the program is incorporated, the integrated circuit executing the method in question or being used in its execution.

BRIEF DESCRIPTION OF THE DRAWINGS

Other features and advantages of the present invention emerge from the following description with reference to the appended drawings, which show a non-limiting embodiment of the invention. In the figures.

DETAILED DESCRIPTION OF ONE EMBODIMENT

Figure 1:
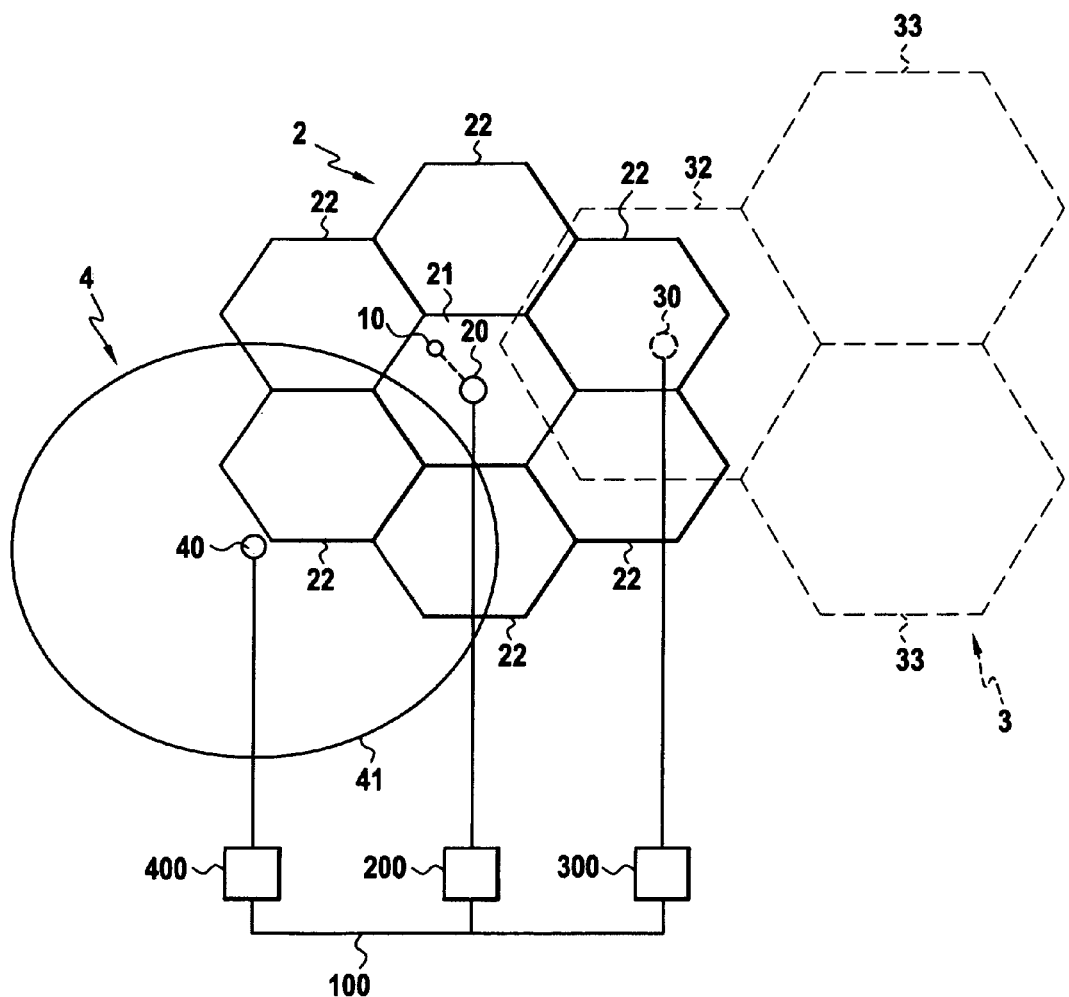
FIG. 1 shows a mobile terminal of the invention in its environment.

FIG. 1 shows a mobile terminal 10 of the invention in its environment.

In this example, the mobile terminal 10 is connected to a base station that defines an attachment cell that attaches the terminal to an attachment cellular network.

In this example, the attachment cellular network can be a public cellular GERAN 2, a public cellular UTRAN 3 or a local area network.

In this figure, a cell 21 of the public cellular GERAN 2 is defined by a base station 20.

Two cells 22 of the cellular GERAN 2 adjoin the GERAN cell 21.

In this figure, a cell 32 of a public cellular UTRAN 3 is defined by a base station 30. Also shown are two cells 33 of the public cellular UTRAN adjoining the UTRAN cell 32 and the GERAN cell 21.

A cell 41 of a local area GAN 4 is defined at least by its access point 40.

The base station 20 of the GERAN 2 and the base station 30 of the UTRAN 3 are respectively controlled and managed by a BSC 200 and an RNC 300.

The access point 40 is controlled by a GANC 400.

The BSC 200, RNC 300, and GANC 400 are connected to a circuit core network and to a packet core network 100.

Figure 2:
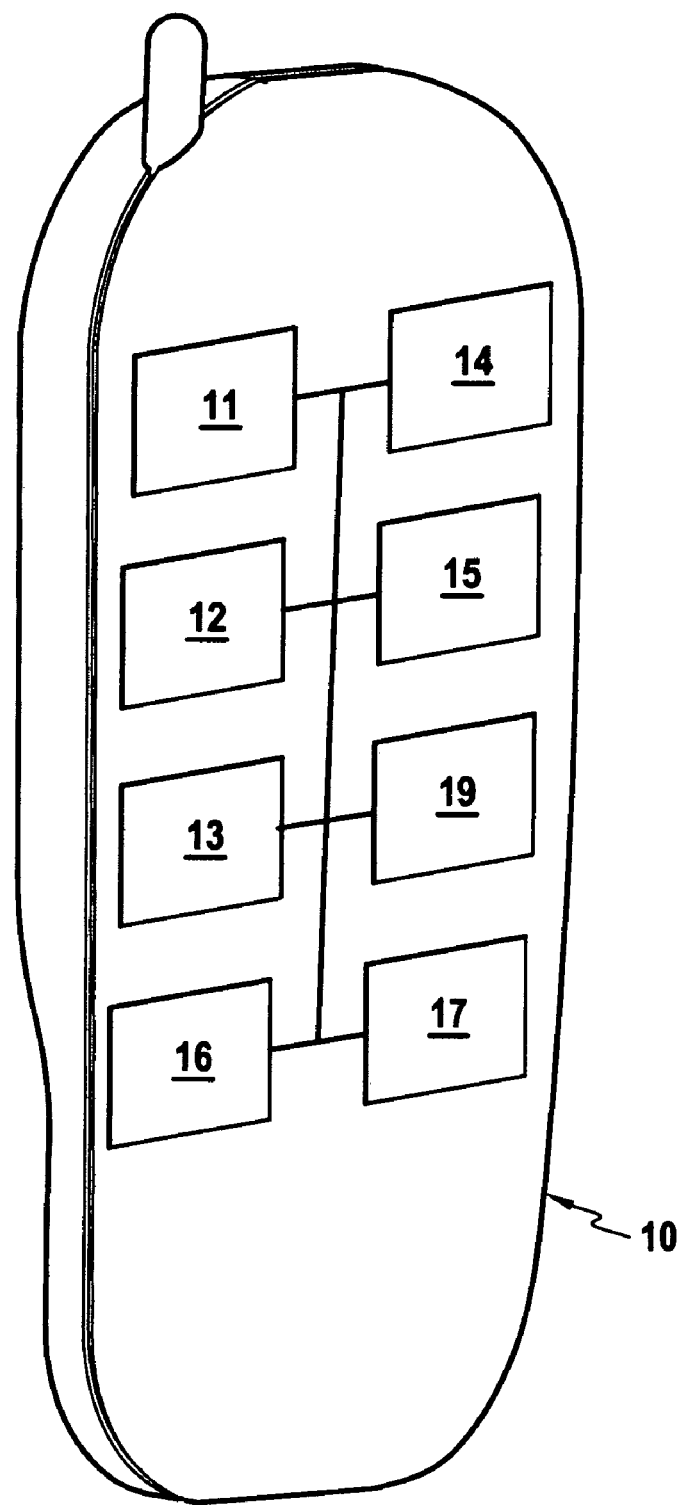
FIG. 2 is a diagram showing a mobile terminal of the invention.

FIG. 2 is a diagram showing an embodiment of a mobile terminal 10 of the invention.

This terminal 10 includes a processor 11, a read-only memory 12, a random-access memory 17, and a non-volatile rewritable flash memory 13.

Figure 3:
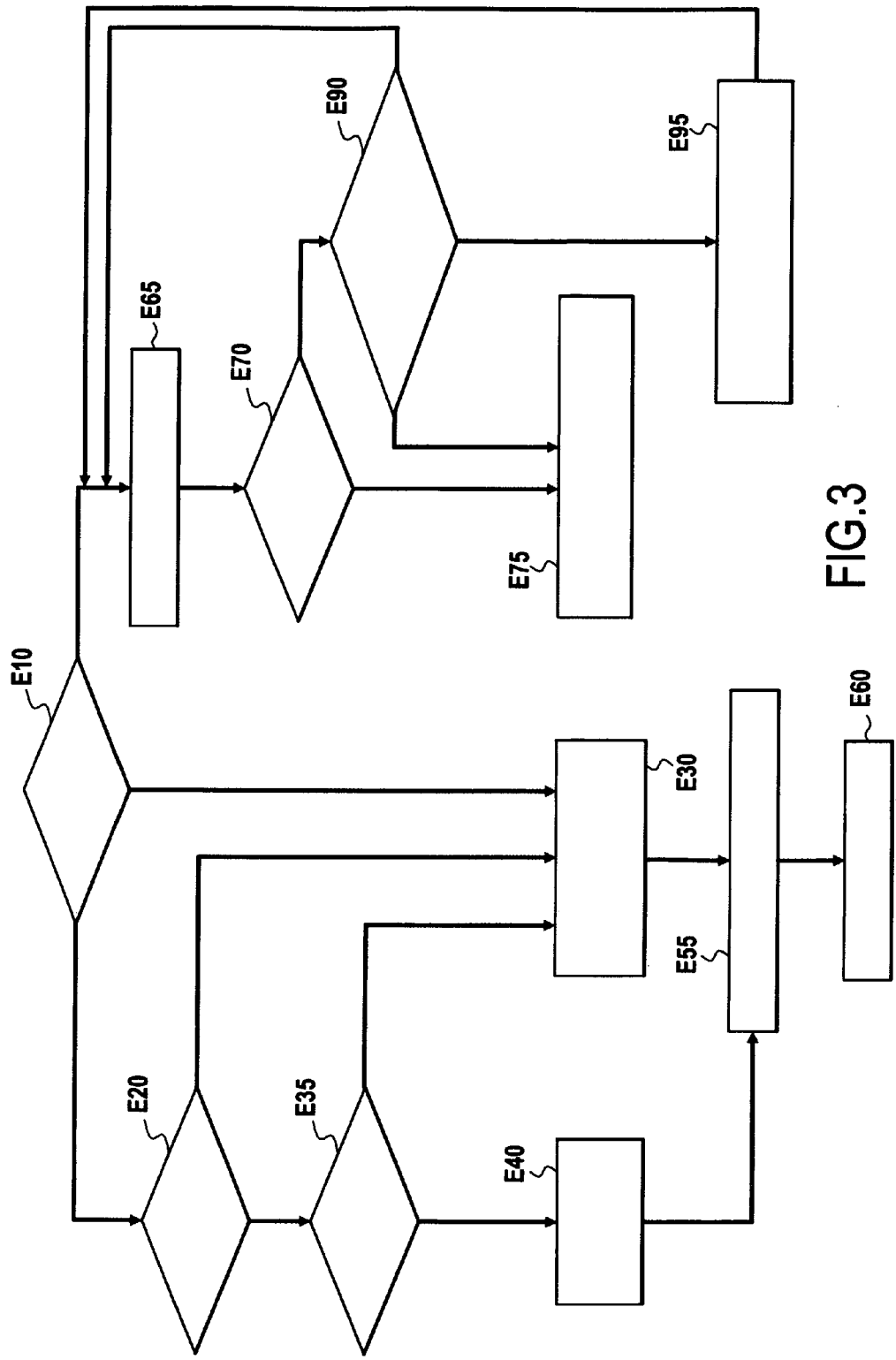
FIG. 3 is a flowchart showing the principal steps of an assignment method and an initiation method of a preferred implementation of the invention.

The read-only memory 12 stores a computer program that includes instructions for executing steps of the assignment method of the invention and the initiation method of the invention, which steps are represented in flowchart form in FIG. 3.

The mobile terminal 10 includes means 14 for connecting it to the base station 20 of the GERAN 2 and to the base station 30 of the UTRAN 3.

These connection means 14 detect the GERAN 2 and the UTRAN 3, measure the signal level from the cell attaching the terminal 10 to the GERAN 2 or the UTRAN 3, and measure the signal level from cells of public cellular networks adjoining this attachment cell.

The terminal 10 also includes means 15 for connecting itself to the access point 40 and means 19 for connecting itself to and registering with the GANC 400.

These connection means 15 detect the presence of an active access point 40 of the local area GAN 4.

The non-volatile rewritable memory 13 stores a configuration by means of which the user chooses the mode of use of the terminal and that can represent the fact that the user wishes to give preference to attaching the terminal 10 to a public cellular GERAN 2 or to a public cellular UTRAN 3 over attaching itself to the local area GAN 4.

In the embodiment described here, the non-volatile rewritable memory 13 stores:
- a value T_GERAN that is equal to the threshold starting from which a cell 21, 22 of the public cellular GERAN 2 can be a candidate for handover; and
- a value $T_{13}$ UTRAN that is equal to the threshold starting from which a cell 32, 33 of the public cellular UTRAN 3 can be a candidate for handover.

In the particular embodiment described here, these values T_GERAN and T_UTRAN are received from the attachment network. They are liable to vary according to transmission conditions in the network.

The processor 11 assigns a dummy signal level to a cell defined at least by the access point 40 by executing the computer program stored in the read-only memory 12.

If the terminal 10 is attached to a base station 20 of the GERAN 2 or to a base station 30 of the UTRAN 3, the connection means 14 send to that base station the dummy signal assigned by the processor 11 and the signal levels measured by the base station connection means 14.

The processor 11 also compares a signal level with a predetermined threshold.

If the mobile terminal is connected to an access point 40 of the GAN 4, the means 15 for connection to that access point are adapted to send measured signal levels to that access point.

The principal steps of the computer program stored in the read-only memory 12 are described below with reference to FIG. 3. This program executes the assignment method and the initiation method of one particular implementation of the invention.

It is assumed in the description below that the terminal 10 is moving in an area covered by the base station 20, the base station 30, and the access point 40.

During a first step E10, the terminal 10 determines which network is its attachment network.

If the terminal 10 is connected to the base station 20, its attachment network is the GERAN 2, and the determination step E10 is followed by a test E20 during which the terminal 10 determines whether it is in the vicinity of cells 32, 33 of the public cellular UTRAN 3 adjoining its attachment cell 21. If this is not, the result of the test E20 is negative. This test is then followed by a step E30 during which the processor 11 of the terminal 10 assigns a dummy signal level T_GERAN as read from the non-volatile rewritable memory 13 to the cell 41 as defined at least by the access point 40.

If, during the test E20, the mobile terminal 10 determines that there is at least one cell 32, 33 of the cellular UTRAN 3 adjoining its attachment cell 21, the result of the test E20 is positive.

That test is then followed by a test E35 during which the mobile terminal 10 determines whether at least one of these cells 32, 33 has a signal level greater than or equal to the threshold T_UTRAN starting from which a cell of the public cellular network UTRAN 3 can be a candidate for handover.

If no cell satisfies this criterion, the result of the test E35 is positive, and this test is followed by the above-described step E30 during which the processor 11 assigns the dummy signal level T_GERAN to the cell 41 as defined at least by the access point 40.

If at least one cell 32, 33 of the cellular UTRAN 3 adjoining the attachment cell 21 has a signal level greater than or equal to the value T_UTRAN, the result of the test E35 is negative.

This test is then followed by a step E40 during which the processor 11 assigns the dummy signal level T_GERAN−1 to the cell 41 as defined at least by the access point 40.

If the terminal 10 determines during the step E10 that it is connected to the base station 30, i.e. that it is attached to the cell 32 of the UTRAN 3, the step E10 is followed by the above-described step E30 during which the processor 11 assigns the dummy signal level T_GERAN to the cell 41 as defined at least by the access point 40.

The steps E30 and E40 of assigning a dummy signal level are followed by a step E55 during which the means 14 for connecting the terminal 10 to the base stations 20, 30 measure the signal level of the attachment cell 21 or 32 and the respective signal levels of the cells of the public cellular networks adjoining that attachment cell.

The dummy signal level of the cell 41 and all these measured signal levels are put into order, starting with the maximum level, and sent to the attachment base station of the terminal 10 during a step E60. These signals are used by the attachment GERAN 2 or the attachment UTRAN 3 to manage handover of the terminal 10 to a cell adjoining that attachment cell or to the cell 41 as defined at least by the access point 40 so as to guarantee continuity of service if the terminal 10 is moving around.

If the terminal 10 determines during the step E10 that it is connected to the access point 40, i.e. that it is attached to a cell 41 of the local area GAN 4, it executes a step E65 similar to the above-described step E55 during which the means 14 of the mobile terminal 10 measure the signal levels of the cells 21, 22, 32, 33 of the public cellular GERAN 2 and of the public cellular UTRAN 3 adjoining the attachment cell 41.

This measurement step E65 is followed by a test E70 during which the processor 11 of the terminal 10 determines whether any of the measured levels are greater than a predetermined threshold (T_GERAN for the cells of the GERAN 2, T_UTRAN for the cells of the UTRAN 3).

If so, the mobile terminal initiates handover by sending, during a step E75, a GA-CSR HANDOVER INFORMATION message that contains a list of the cells of the GERAN 2 and of the UTRAN 3 adjoining the attachment cell 41, together with their signal levels.

In contrast, if the mobile terminal 10 determines during the step E70 that none of the cells of the public cellular GERAN 2 or the public cellular UTRAN 3 adjoining the attachment cell 41 has a level higher than the predetermined threshold, then the mobile terminal 10 must remain attached to the local area GAN 4.

Also, during a step E90, the terminal 10 determines if it has received a GA-CSR UPLINK QUALITY INFORMATION message from the local area network 4. If not so, then this determination step E90 is followed by the above-described step E65 of measuring the signal levels of the public network cells.

If the terminal detects during the step E90 that it has received the GA-CSR UPLINK QUALITY INFORMATION message from the local area network 4, and if this message requires handover within the GAN 4, then the terminal connects to another access point of the GAN 4 (step E95). This connection step is followed by the above-described step E65 of measuring the signal levels of the public network cells.

In contrast, if this message requires handover to the cellular GERAN 2 or the cellular UTRAN 3, the mobile terminal 10 initiates handover to the cellular GERAN 2 or the cellular UTRAN 3 by executing the initiation above-described step E75.

The invention claimed is:

1. A method of assigning a signal level that can be used in a mobile terminal connected to a base station defining an attachment cell attaching the terminal to an attachment public cellular network, the terminal being configured to give preference to attaching itself to a public cellular network over attaching itself to a local area network, wherein the method comprises:

detecting the presence of an active access point of the local area network and, in the event of such detection, assigning a dummy signal level (Lev41) to a cell defined at least by said access point;

measuring the signal level of said attachment cell and of cells of public cellular networks adjoining said attachment cell;

sending to said base station both said dummy signal level (Lev41) and said measured signal levels, said attachment public cellular network using said measured signal levels to manage handover of said terminal from said attachment cell to one of said adjoining cells or to said cell defined at least by said access point, to provide continuity of service if said terminal is moving around; and assigning said dummy signal level (Lev41) to be greater than or equal to a threshold stored in said terminal, the stored threshold being a threshold starting from which a cell of a first public cellular network can be a candidate for handover, and less than or equal to a function of the measured signal levels of cells of the first public cellular network which are adjoining said attachment cell, when one of the following conditions is met:

(i) said attachment cell is a cell of the first public cellular network having no adjoining cell of a second public cellular network for which the signal level is greater than or equal to a threshold starting from which a cell of the second public cellular network can be a candidate for handover; or (ii) said attachment cell is a cell of the second public cellular network.

2. The assignment method according to claim 1, wherein said attachment cell is a cell of the second public cellular network, which is a public cellular UTRAN, and wherein the cell defined at least by said access point is considered as a cell of the first public cellular network, which is a public cellular GERAN, wherein said dummy signal level (Lev41) is chosen so that:

$$T\_GERAN \leq Lev41 \leq \max[T\_GERAN, \min(List\_GERAN)-1];$$

where:
   T_GERAN is a threshold level starting from which a cell of the public cellular GERAN can be a candidate for handover;
   List_GERAN is the set of signal levels of the cells of the public cellular GERAN adjoining said attachment cell for which the signal level is greater than T_GERAN; and
   min (List_GERAN) is the minimum value of the set List_GERAN.

3. The assignment method according to claim 1, wherein said attachment cell is a cell of the first public cellular network, which is a public cellular GERAN, having no adjoining cell of second public cellular network, which is a public cellular UTRAN, for which the signal level is greater than or equal to a threshold starting from which a cell of the public cellular UTRAN can be a candidate for handover and the cell defined at least by said access point is considered as a cell of the public cellular GERAN, wherein said dummy signal level (Lev41) is chosen so that:

$$T\_GERAN \leq Lev41 \leq \max[T\_GERAN, \min(List\_GERAN)-1];$$

where:
   T_GERAN is a threshold level starting from which a cell of the public cellular GERAN can be a candidate for handover;
   List_GERAN is the set of signal levels of the cells of the public cellular GERAN adjoining said attachment cell and for which the signal level is greater than T_GERAN; and
   min (List_GERAN) is the minimum value of the set List_GERAN.

4. The assignment method according to claim 1, wherein said attachment cell is a cell of the first public cellular network, which is a public cellular GERAN, having an adjoining cell of the second public cellular network, which is a public cellular UTRAN, in which the signal level is greater than or equal to a threshold starting from which a cell of the public cellular UTRAN can be a candidate for handover and wherein the cell defined at least by said access point is considered as a cell of a public cellular GERAN, wherein said dummy signal level (Lev41) is chosen so that:

$$Lev41 \leq T\_GERAN;$$

where T_GERAN is a threshold level starting from which a cell of the public cellular GERAN can be a candidate for handover.

5. The assignment method according to claim 1, further comprising receiving said threshold from said attachment public cellular network.

6. A non-transitory computer-readable storage medium on which is stored a computer program comprising instructions for executing the steps of the signal level assignment method according to claim 1.

7. A mobile terminal comprising:
- means for connection to a base station defining a cell attaching said terminal to an attachment public cellular network;
- means for connection to an access point defining a cell attaching said terminal to a local area network;
- configuration means for giving preference to attaching the terminal to a public cellular network over attaching the terminal to a local area network;
- means for detecting the presence of an active access point of a local area network;
- means for assigning a dummy signal level (Lev41) to a cell defined at least by said access point;
- means for measuring the signal level of said attachment cell and the cells of public cellular networks adjoining said attachment cell; and
- means for sending to said base station both said dummy signal level (Lev41) and said measured signal levels, the measured signal levels being used by said attachment public cellular network to manage handover of said terminal from said attachment cell to one of said adjoining cells or to said cell defined at least by said access point to provide continuity of service when said terminal is moving around, wherein said dummy signal level (Lev41) is assigned to be greater than or equal to a threshold stored in said terminal, the stored threshold being a threshold starting from which a cell of a first public cellular network can be a candidate for handover, and less than or equal to a function of the measured signal levels of cells of the first public cellular network which are adjoining said attachment cell, when one of the following conditions is met:
  - (i) said attachment cell is a cell of the first public cellular network having no adjoining cell of a second public cellular network for which the signal level is greater than or equal to a threshold starting from which a cell of the second public cellular network can be a candidate for handover; or
  - (ii) said attachment cell is a cell of the second public cellular network.

8. A method of assigning a signal level that can be used in a mobile terminal connected to a base station defining an attachment cell attaching the terminal to an attachment public cellular network, the terminal being configured to give preference to attaching itself to a public cellular network over attaching itself to a local area network, wherein the method comprises:
- detecting the presence of an active access point of the local area network and, in the event of such detection, assigning a dummy signal level (Lev41) to a cell defined at least by said access point;
- measuring the signal level of said attachment cell and of cells of public cellular networks adjoining said attachment cell;
- sending to said base station both said dummy signal level (Lev41) and said measured signal levels, said attachment public cellular network using said measured signal levels to manage handover of said terminal from said attachment cell to one of said adjoining cells or to said cell defined at least by said access point, to provide continuity of service if said terminal is moving around; and
- assigning said dummy signal level (Lev41) as a function of a threshold stored in said terminal, the stored threshold being a threshold starting from which a cell of a public cellular network can be a candidate for handover, wherein said attachment cell is a cell of a public cellular UTRAN and wherein the cell defined at least by said access point is considered as a cell of a public cellular GERAN, wherein said dummy signal level (Lev41) is chosen so that:

$$T\_GERAN \leq Lev41 \leq \max[T\_GERAN, \min(List\_GERAN)-1];$$

where:
- $T\_GERAN$ is a threshold level starting from which a cell of a public cellular GERAN can be a candidate for handover;
- $List\_GERAN$ is the set of signal levels of the cells of a public cellular GERAN adjoining said attachment cell for which the signal level is greater than $T\_GERAN$; and
- $\min(List\_GERAN)$ is the minimum value of the set $List\_GERAN$.

9. A method of assigning a signal level that can be used in a mobile terminal connected to a base station defining an attachment cell attaching the terminal to an attachment public cellular network, the terminal being configured to give preference to attaching itself to a public cellular network over attaching itself to a local area network, wherein the method comprises:
- detecting the presence of an active access point of the local area network and, in the event of such detection, assigning a dummy signal level (Lev41) to a cell defined at least by said access point;
- measuring the signal level of said attachment cell and of cells of public cellular networks adjoining said attachment cell;
- sending to said base station both said dummy signal level (Lev41) and said measured signal levels, said attachment public cellular network using said measured signal levels to manage handover of said terminal from said attachment cell to one of said adjoining cells or to said cell defined at least by said access point, to provide continuity of service if said terminal is moving around; and
- assigning said dummy signal level (Lev41) as a function of a threshold stored in said terminal, the stored threshold being a threshold starting from which a cell of a public cellular network can be a candidate for handover, wherein said attachment cell is a cell of a public cellular GERAN having no adjoining cell of a public cellular UTRAN for which the signal level is greater than or equal to a threshold starting from which a cell of a UTRAN public cellular network can be a candidate for handover and the cell defined at least by said access point is considered as a cell of a public cellular GERAN, wherein said dummy signal level (Lev41) is chosen so that:

$$T\_GERAN \leq Lev41 \leq \max[T\_GERAN, \min(List\_GERAN)-1];$$

where:
- $T\_GERAN$ is a threshold level starting from which a cell of a public cellular GERAN can be a candidate for handover;
- $List\_GERAN$ is the set of signal levels of the cells of a public cellular GERAN adjoining said attachment cell and for which the signal level is greater than $T\_GERAN$; and
- $\min(List\_GERAN)$ is the minimum value of the set $List\_GERAN$.

* * * * *